United States Patent [19]

Westley

[11] 4,006,393
[45] Feb. 1, 1977

[54] MOTOR CONTROL SYSTEM USING A HEATED MEMBER TO PROVIDE MODULATION

[75] Inventor: Curtis E. Westley, St. Louis Park, Minn.

[73] Assignee: Honeywell Inc., Minneapolis, Minn.

[22] Filed: Apr. 21, 1975

[21] Appl. No.: 569,725

[52] U.S. Cl. .............................. 318/473; 318/208; 318/676; 238/68

[51] Int. Cl.² ......................................... G05B 11/01

[58] Field of Search .......... 318/473, 676, 471, 472, 318/221 H, 208, 207 R; 236/68 C, 68 R, 68 B

[56] References Cited

UNITED STATES PATENTS

| | | | |
|---|---|---|---|
| 2,783,423 | 2/1957 | Streater et al. ...................... | 318/676 |
| 3,662,241 | 5/1972 | Sweger ............................... | 318/473 |
| 3,717,803 | 2/1973 | Sweger ........................... | 318/676 X |
| 3,931,560 | 1/1976 | Willson .......................... | 318/473 X |

*Primary Examiner*—B. Dobeck
*Attorney, Agent, or Firm*—Alfred N. Feldman

[57] ABSTRACT

A reversible electric motor is caused to modulate a load in response to an off-on condition responsive device, such as a thermostat. The thermostat completes an electric circuit through an electric heater which in turn supplies heat to a bimetal. The time constant of the bimetal and heater provides a modulating action to a three position motor control switch means which has a center open position. The motor provides a follow-up action through a cam or similar mechanism to rebalance and control an appropriate load, such as a temperature altering medium source.

6 Claims, 6 Drawing Figures

MOTOR CONTROL SYSTEM USING A HEATED MEMBER TO PROVIDE MODULATION

BACKGROUND OF THE INVENTION

In many types of motor operated control systems, and particularly in temperature responsive systems, the condition responsive element is an off-on type of condition sensor. Many condition responsive systems require a modulating type of control action in order to maintain the desired control function. Obtaining a modulating action from a normally on-off type of condition sensor, such as a thermostat, is rather complex and expensive. An off-on type of condition sensor can be used with a heat motor type of actuator, which has a long time constant of operation, to provide a modulating-like function. A heat motor actuator, however, ordinarily does not have sufficient power to operate a substantial load without becoming excessively costly.

SUMMARY OF THE INVENTION

The present invention is direction to a unique type of modulating control system that utilizes a conventional bidirectional motor operator, and a heat responsive bimetal element for the control of the motor itself. A relatively small amount of power can be supplied through an off-on type condition responsive controller, such as a thermostat, to the heater that is associated with the bimetal. This allows for the operation of an off-on type controller to independently control the heat through a relatively small heater and bimetal to control a switch means that operates a conventional electric motor that is capable of delivering a substantial amount of power to control a load. The load ordinarily would be one that would in turn control or alter the flow of the medium that affects the condition responsive element. In the case of a heating or cooling system and the use of a thermostat, the condition altering medium would normally be controlled by a valve, damper, or similar element in the heating or cooling control system.

In the present invention the modulating control system can be energized from either a low voltage or line voltage source, while the thermostat or condition sensing device can be energized from a completely independent source. This allows the use of a line voltage motor with a low voltage thermostat, or the use of a line voltage thermostat with a conventional line voltage control motor.

DESCRIPTION OF THE PREFERRED EMBODIMENT

Figure 1:
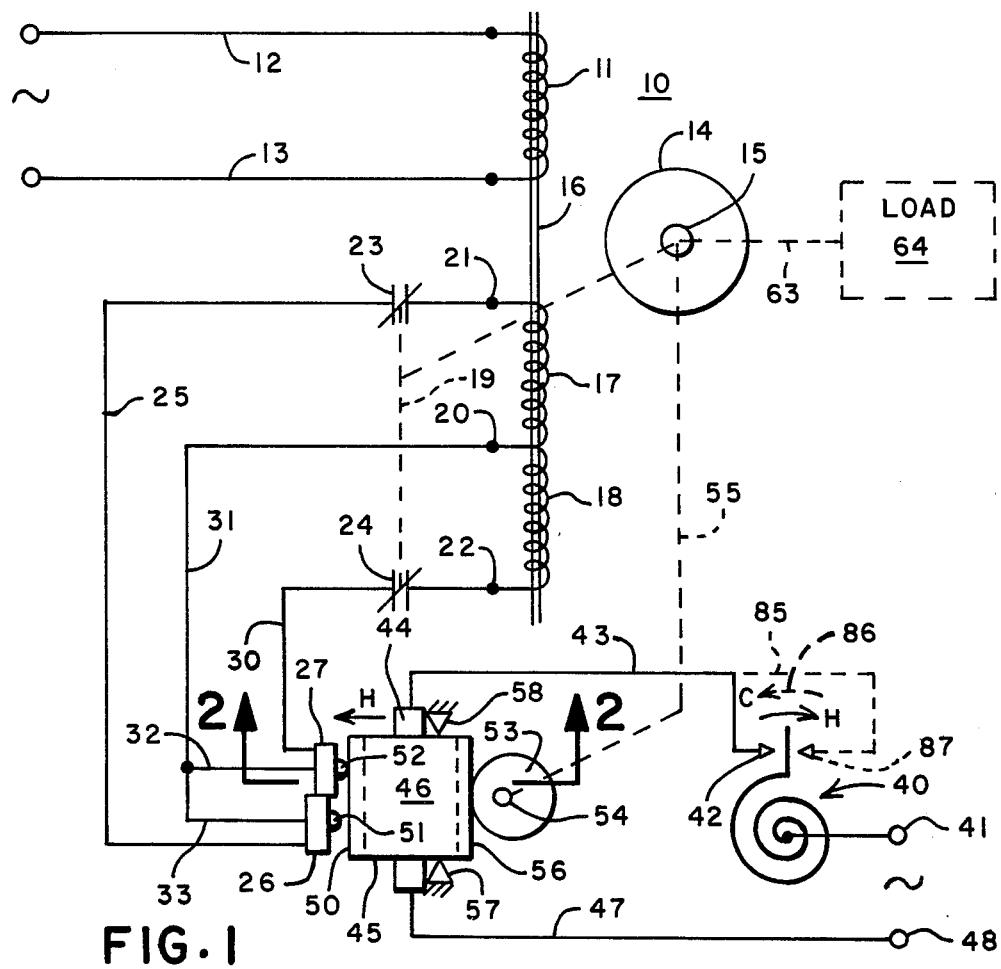
FIG. 1 is a schematic representation of a shaded pole reversible electric motor utilizing a thermostat, bimetal, and a pair of unitary switches to provide the control function.

In FIG. 1 a complete schematic representation of a modulating control system is disclosed. A shaded pole, bidirectional electric motor means is disclosed at 10 including a stator winding 11 and a pair of conductors 12 and 13 which are adapted to be connected to a source of electric power to energize the motor means 10. The motor means 10 further has a rotor 14 which has an output shaft 15. The stator winding 11 is provided on a laminated stator structure 16 that further includes a pair of shaded pole windings 17 and 18. The windings 11, 17, and 18 are conventional in a shaded pole bidirectional type of control motor. When the winding 11 is energized from an appropriate source, shorting of the winding 17 causes the motor means 10 to rotate in the direction, while the shorting of the winding 18 causes the motor means 10 to operate in the opposite direction.

The windings 17 and 18 have a common connection 20 and individual circuit connections 21 and 22. The circuit connection 21 is connected through a limit switch 23 while the circuit connection 22 is connected through a limit switch 24. The limit switches 23 and 24 are connected by mechanical means 19 to the rotor 14 of the motor means 10. This limit switch function is conventional in a bidirectional shaded pole type control motor.

The limit switch 23 is connected by a wire 25 to a normally open switch 26, such as a conventional snap switch. A second switch of a normally closed type is disclosed at 27 and is connected by conductor 30 to the limit switch 24. The common connection 20 between the windings 17 and 18 is connected by conductor 31 to a pair of conductors 32 and 33 that electrically connect a common terminal of the switches 26 and 27 together. The normally open switch 26 and the normally closed switch 27 can be operated together to provide a three position switch means having a center open position. This will be explained in more detail in connection with FIG. 3 and the graph of FIG. 4.

A condition responsive means 40 has been disclosed as a conventional bimetal operated thermostat that is connected to a power terminal 41 and rotates in a counterclockwise directon when calling or heat. Whenever the condition responsive means 40 is exposed to a falling temperature, a contact 42 is provided so that the thermostat or condition responsive means 40 is capable of closing an electric circuit between the terminal 41 and th contact 42. The contact 42 is connected by a conductor 43 to an electric heating element 44 which passes through a bight 45 of a bimetal means 46. Bimetal means 46 can be any form of thermally responsive means and is shown as a bimetal means for convenience. The bimetal means 46 can be seen in greater detail in FIG. 2 and is formed in a general U-shaped configuration with the bight 45 in a heat exchange relationship with the electric heater 44. The electric heater 44 is connected by a conductor 47 to a terminal 48 that is energized along with the terminal 41 to supply electrical energy through the thermostat or condition control means 40. It will be understood that whenever the condition control means 40 is cooled by a falling ambient temperature that the circuit between the terminals 41 and 42 is completed thereby providing electric current to the heater 44 to raise the temperature of the bimetal means 46.

The bimetal means 46 has a surface 50 that operates against a pair of plungers 51 and 52 of the switches 26 and 27. In the position shown in FIG. 1, the bimetal means 46 is just touching the plunger of normally closed switch 27 and the plunger 52 has not been depressed. This is the extreme right hand position of travel for the bimetal surface 50 and establishes a condition in which the shaded pole winding 18 is short circuited while the shaded pole winding 17 is open circuited. Under these conditions the motor means 10 would rotate in an appropriate direction selected by the operation or shorting of the winding 18.

To complete the system, a cam 53 is mounted for rotation around a shaft 54 that is mechanically linked at 55 to the rotor 15 of the motor means 10. The cam 53 rides against a surface 56 of the bimetal means 46 and is capable of tilting or rotating the bimetal 46 by a camming action due to a pair of pivots 57 and 58. The structure of the bimetal means 46, its pivot arrangement, and a camming action can best be seen in FIG. 2.

Figure 2:
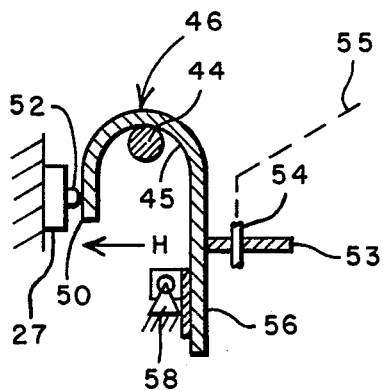
FIG. 2 is a cross section along line 2—2 of FIG. 1 disclosing a detail of the bimetal and switch arrangement.
Figure 3:
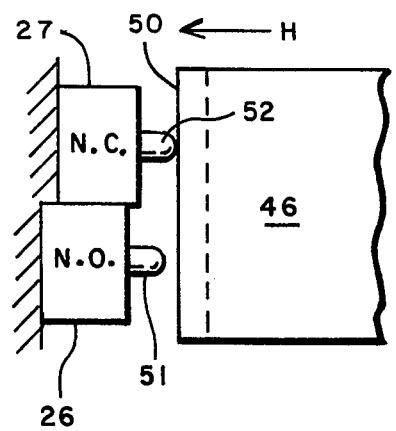
FIG. 3 is an enlarged switch and bimetal detail.

In FIG. 2 it can be seen that as the cam 53 rotates with the shaft 54, a force is applied to surface 56 which forces the bimetal means 46 to rotate around the pivots 57 and 58 in a counterclockwise direction thereby applying a force from the surface 50 to the plunger 52 of the normally closed switch 27. The same reference numerals are applied to FIG. 3 which is an enlarged view of just the switches 26 and 27 along with the bimetal means 46. In FIG. 3, the bimetal means 46 is shown again just as the surface 50 has come into contact with the plunger 52 of the switch means 27. It can be seen that as the bimetal means 46 moves to the left, either under the action of the cam 53 or under the action of the heating from the heater 44, that the surface 50 will move against the plunger 51 and 52 thereby operating the switches 26 and 27 in sequence.

Figure 4:
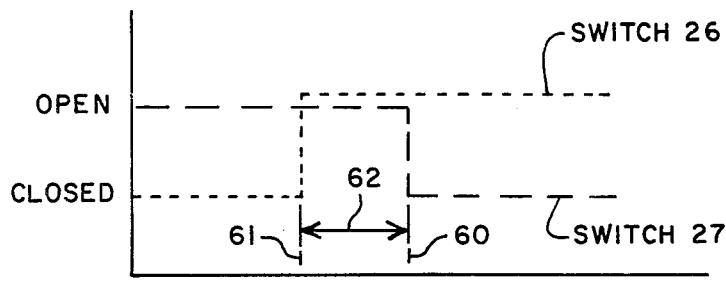
FIG. 4 is a graph showing the operating functions of the switches of FIGS. 1 and 3.

This can be seen in the graph of FIG. 4 wherein the travel of the surface 50 of the bimetal means 46 is accomplished from right to left. The switch 26 is in a normally open state while the switch 27 is in a normally closed state. Upon reaching a position of travel designated at 60, the switch 27 opens, while the switch 26 is still open. The switches are both open until a position of travel 61 is reached. The two switches 26 and 27 thus provide a center open position 62 and two separate closed positions. The normal operating mode of the motor control system disclosed in FIGS. 1 through 4 is in the range approximating 62 in the graph of FIG. 4.

When the rotational position of cam 53 and the position of surface 50 is such that the switches 26 and 27 are both open at 62, the motor means 10 is at rest. If the thermostat 40 than closes applying current to the heater 44, the bimetal means 46 will be heated and the surface 50 will move to the left under the heat from the heater 44. The movement of the surface 50 to the left closes switch 26 while continuing the open condition of switch 27. This causes the winding 17 to be short circuited and the motor rotates in a direction so that the cam 53 allows the surface 50 to move in a direction (to the right) to open circuit both of the switches 26 and 27 thereby causing the motor to come to a stop once again. The operation of the cam 53 in conjunction with the switches 26 and 27 always cause the motor means 10 to operate to drive towards the open circuit condition for both switches as shown at 62 in the graph of FIG. 4. The system thus always modulates to drive in a direction so that the surface 50 of the bimetal means 46 always tends to provide an open circuit after the heating of the heating element 44 or the natural cooling of the bimetal means 46. It is understood that the natural cooling of the bimetal means 46 causes the surface 50 to move to the right thereby tending to cause switch 27 to become closed, thereby energizing the motor to drive to force the surface 50 to the left.

The motor means 10 is further connected by an output shaft 63 to any convenient load 64. The load 64 normally is a valve, air-conditioning contactor, damper, or other control mechanism for controlling the temperature of a medium to which the condition control device or thermostat 40 is responsive.

In FIG. 1 a dashed connection 85 has been disclosed along with a direction for cooling 86, and an additional contact 87. If the system were connected with the alternate arrangement of conductor 85, rotation of direction 86, and contact 87, the system would operate in a cooling mode rather than in a heating mode. It is thus apparent that the system of FIG. 1 could be adapted to be used in a heating or cooling system depending on the type of thermostat, merely by reversing the mode of operation of the condition sensing means 40.

Figure 5:
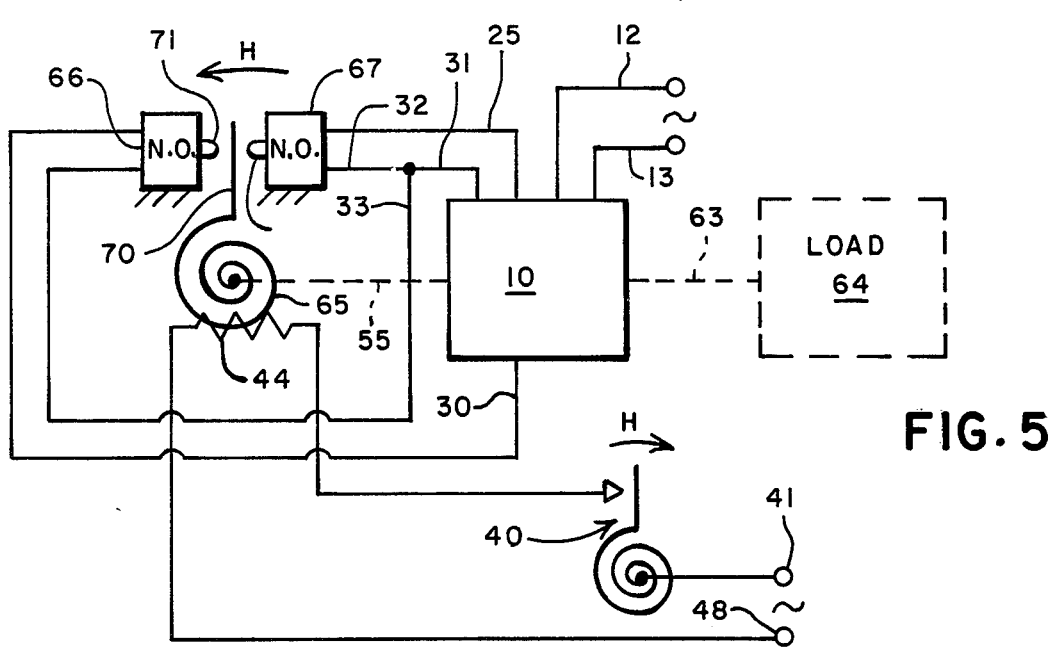
FIG. 5 is a complete schematic of a system utilizing two identical switches and a separate bimetal operator.

In FIG. 5, a simplified system has been disclosed with motor means 10 energized by conductors 12 and 13 and having an output shaft 63 connected again to a load 64. A condition responsive means or thermostat 40 is again shown connected between terminals 41 and 48 to supply an electric heater 44 with energy whenever the condition responsive means or thermostat 40 is closed. The U-shaped bimetal means 46 has been replaced by a coiled bimetal means 65 which is on the shaft 55 and does away with the need for a cam 53. When the shaft 55 rotates, the entire bimetal means 65 rotates. The normal heating direction for the bimetal 65 has been indicated as counterclockwise, whereas the motor travel to offset this would be clockwise. A pair of switches 66 and 67 which are both normally open switches are again provided with a common conductor means 31, 32, 33, and two conductors 25 and 30 from the motor means 10 to the other sides of the switches.

The operation of FIG. 5 is that motor energizing power is supplied on conductors 12 and 13 to the motor means 10 and the motor means 10 rotates the shaft 55 until the bimetal 65 is in the center position shown. In the position shown, neither of the switches 66 or 67 is closed by the operation of a projection 70 between the plunger 71 of switch 66 and the plunger 72 of switch 67. In the condition shown in FIG. 5, the motor would be in a balanced position and the thermostat or condition responsive means 40 would be open circuited. If the temperature dropped at the thermostat 40, and the thermostat 40 closed, power would be supplied to the heater 44 which would heat the bimetal means 65 and cause the projection 70 to rotate counterclockwise against the plunger 71 to close the switch 66. As soon as the switch 66 closed, the motor means 10 would be energized and the shaft 55 would rotate so that the bimetal means 65 would rotate in a clockwise direction thereby opening the switch 66 and bringing the load 64 to a new position. The time constants of this type of system are quite slow due to the heating characteristics of the heater 44 and the response of the bimetal 65. As such, the system is capable of modulating, as indicated. As the load 64 satisfies the demand from the thermostat 40, the thermostat open circuits and the heater 44 is disconnected. As the bimetal 65 cools it rotates in a clockwise direction against the plunger 72 to close the switch 67 causing the motor means 10 to be energized for rotation of shaft 55 in a counterclockwise direction thereby driving the projection 70 to the intermediate disclosed position. It is thus apparent that the system of FIG. 5 utilizes the same concepts as that of FIG. 1, but uses two normally open type switches with plungers 71 and 72 that are operated by the projection 70 to provide the modulating control.

Figure 6:
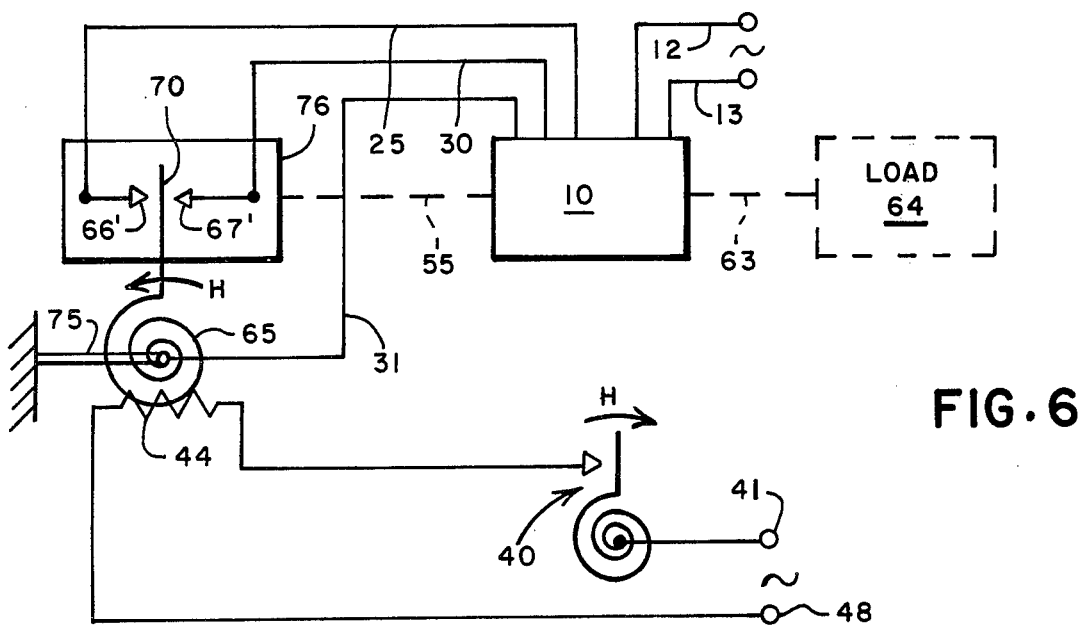
FIG. 6 is a complete schematic diagram of a further system utilizing a simplified switch configuration.

The system of FIG. 6 is very similar to that of FIG. 5 except that the two normally open switches 66 and 67 have been replaced by contact 66' and contact 67'. The common electric circuit 31 in this particular case is connected through the bimetal 65 which is fixed in space at 75. The motor output shaft 55 in this case is connected to an insulating mounting member 76 which mounts the contacts 66' and 67' so that they move together and cooperate with the projection 70 which becomes the third contact of the switch means. In the position disclosed in FIG. 6, the contacts 66' and 67' are separated from the projection 70. Upon the heater 44 being energized through the thermostat 40, the bimetal means 65 causes the projection 70 to rotate in a counterclockwise direction to complete a circuit between the projection 70 and the contact 66'. This causes the motor means 10 to operate so that the shaft 55 moves the insulating support 76 to the left thereby open circuiting the connection between the projection 70 and the contact 66. When the temperature of the bimetal means 65 declines and the bimetal projection 70 moves in a clockwise direction, a circuit is completed between the projection 70 and the contact 67'. This causes the motor means 10 to operate to move the insulating member 76 to the right, thereby open circuiting the connecton between the projection 70 and the contact 67'. In effect, FIG. 6 has the same function as FIG. 5 except in FIG. 6 part of the switch contact structure moves in response to the rotation of the motor means 10 while in FIG. 5 the switches are fixed in space and the bimetal means 65 rotates with respect to the fixed switch structure.

It is obvious that a number of types of switch configurations combined with the output shaft movement of the motor means 10 can be provided. The type of condition responsive system and load means 64 also can vary widely. The only requirement is that an electric circuit switching device of an on-off nature is provided, and which causes the movement of the motor and an associated load to alter the medium to which the condition responsive device responds thereby resetting the system in a modulating fashion. The present arrangement can be used with line voltage applied to both sets of terminals, low voltage applied to both sets of terminals, or two different voltages applied to the different sets of terminals thereby providing a number of possible variations in applications of the present invention. These variations in the invention are limited solely in their scope by the appended claims.

The embodiments of the invention in which an exclusive property or right is claimed are defined as follows:

1. A modulating control system, including: bidirectional electric motor means adapted to be connected to a source of electric power to energize said motor means with said motor means including output means; said motor means including a first control circuit which when completed causes said motor means to operate in a first direction, and a second control circuit which when completed causes said motor to operate in a second direction; each of said control circuits including a safety limit switch to open circuit its associated control circuit in the event said motor means is caused to rotate to a predetermined safe limit; three position switch means including two snap switch means connected so as to have a center open position and two separate closed positions; said first control circuit completed through a first of said separate closed switch positions and said second control circuit completed through a second of said separate closed switch positions; thermally responsive means including electric heater means to cause said thermally responsive means to move when said electric heater means is energized; and said motor output means controlling said switch means in conjunction with the movement of said thermally responsive means; said thermally responsive means closing said switch means upon the temperature of said thermally responsive means changing to thereby cause said motor means to operate; said motor output means modulating and thereby causing said switch means to return to said center open position.

2. A modulating control system is described in claim 1 wherein said thermally responsive means is bimetal means.

3. A modulating control system as described in claim 2 wherein said bimetal means is a single bimetal element formed into a U-shaped with said electric heater means being a heating element attached to said U-shaped bimetal element.

4. A modulating control system as described in claim 3 wherein said first switch circuit means is normally closed and said second switch circuit means is normally open with said bimetal element biasing said switch means to an intermediate position wherein both said switch circuit means have an overlapping open circuit condition.

5. A modulating control system as described in claim 4 wherein said motor means is a shaded pole reversible motor and said first and said second control circuits included shaded pole control windings and said limit switches.

6. A modulating control system as described in claim 5 wherein said control system includes a thermostat connected to said electric heating element to control a current flow in said heating element in response to said thermostat with said electric heating element attached to the bight of said U-shaped bimetal element; said system operation modulating said motor output means which is adapted to control a temperature altering medium source to which said thermostat is responsive.

\* \* \* \* \*

UNITED STATES PATENT OFFICE
CERTIFICATE OF CORRECTION

PATENT NO. : 4,006,393
DATED : February 1, 1977
INVENTOR(S) : Curtis E. Westley

It is certified that error appears in the above–identified patent and that said Letters Patent are hereby corrected as shown below:

Claim 2, line 1, cancel "is" and substitute
--as--.

Claim 5, line 4, cancel "included" and substitute
--include--.

Signed and Sealed this

Third Day of May 1977

[SEAL]

Attest:

RUTH C. MASON
Attesting Officer

C. MARSHALL DANN
Commissioner of Patents and Trademarks